Nov. 22, 1932.  C. B. COTTRELL, 3D  1,888,792
LATHE
Filed April 24, 1930   2 Sheets-Sheet 1

INVENTOR
Calvert B Cottrell 3rd
BY
ATTORNEYS

Nov. 22, 1932.  C. B. COTTRELL, 3D  1,888,792
LATHE
Filed April 24, 1930  2 Sheets-Sheet 2
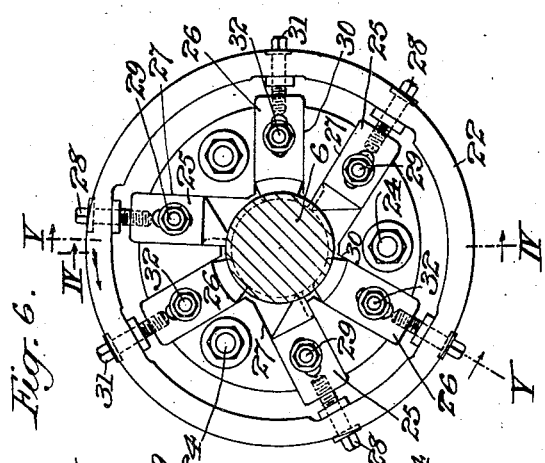
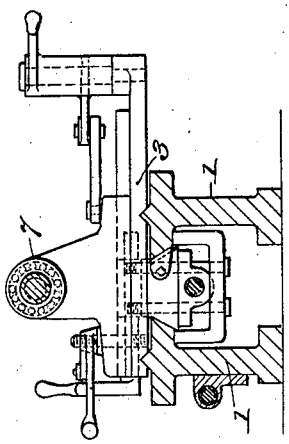
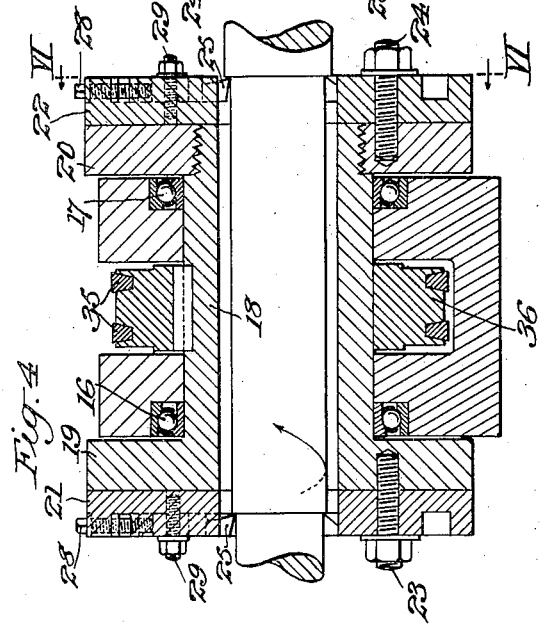
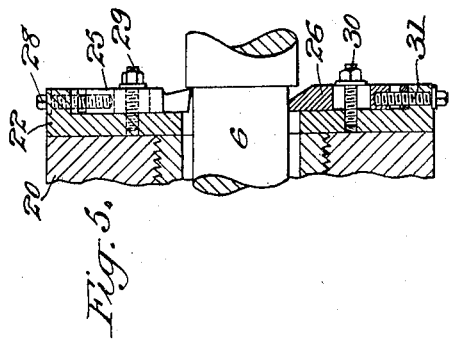
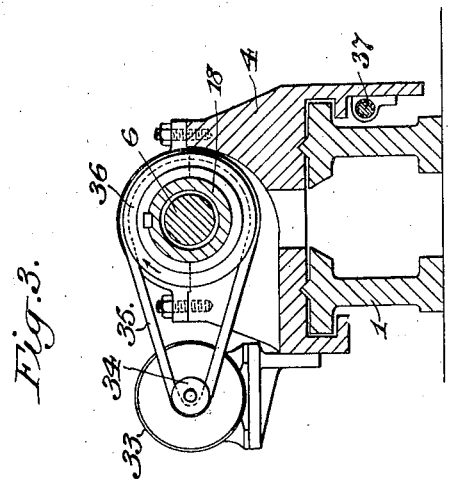
INVENTOR
Calvert B. Cottrell, 3rd
BY
ATTORNEYS Patented Nov. 22, 1932

1,888,792

UNITED STATES PATENT OFFICE

CALVERT B. COTTRELL, 3D, OF WESTERLY, RHODE ISLAND, ASSIGNOR TO C. B. COTTRELL & SONS COMPANY, OF WESTERLY, RHODE ISLAND, A CORPORATION OF DELAWARE

LATHE

Application filed April 24, 1930. Serial No. 446,395.

The object of my invention is to produce certain improvements in a turning lathe, whereby the cutters may be revolved around the work at high surface speeds without chattering or vibration.

My invention comprises a cutter holder rotatably mounted on the lathe carriage, in which holder one or more circular series of cutters are mounted, and means, as an electric motor mounted on the carriage and having a belt drive connection with the cutter holder, is provided for revolving the cutters rapidly around the work.

My invention further comprises means for imparting a relative feeding movement to the holder and work, said means in the present instance being shown as an electric motor for feeding the lathe carriage with its tool holder, back and forth along the work.

My invention still further comprises means, as an electric motor, for slowly rotating the work in the opposite direction from that in which the cutters are being rapidly revolved, thereby ensuring a perfectly round cutting of the work.

My invention is particularly designed for turning down shafts by the use of cutters of high speed material as, for instance, tungsten carbide.

A practical embodiment of my invention is represented in the accompanying drawings, in which Fig. 1 represents my improved lathe in top plan with a shaft held therein and engaged by the revolving cutters;

Fig. 3 represents a transverse vertical section taken in the plane of the line III—III of Fig. 2;

Fig. 4 represents a detail longitudinal section, on an enlarged scale, taken in the plane of the line IV—IV of Fig. 6, looking in the direction of the arrows;

Fig. 5 represents a detail longitudinal section, on the same scale, taken in the plane of the line V—V of Fig. 6, looking in the direction of the arrows;

Fig. 6 represents a transverse section, on the same scale, taken in the plane of the line VI—VI of Fig. 4, looking in the direction of the arrows; and Fig. 7 represents a transverse section taken in the plane of the line VII—VII of Fig. 2, looking in the direction of the arrows.

Figure 1:
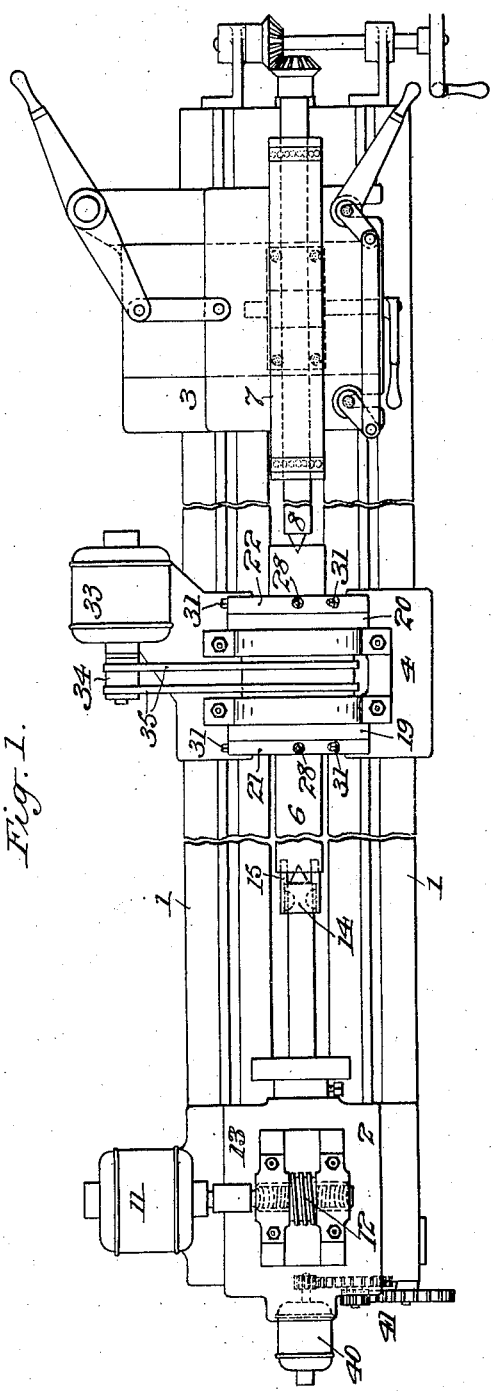
Figure 2:
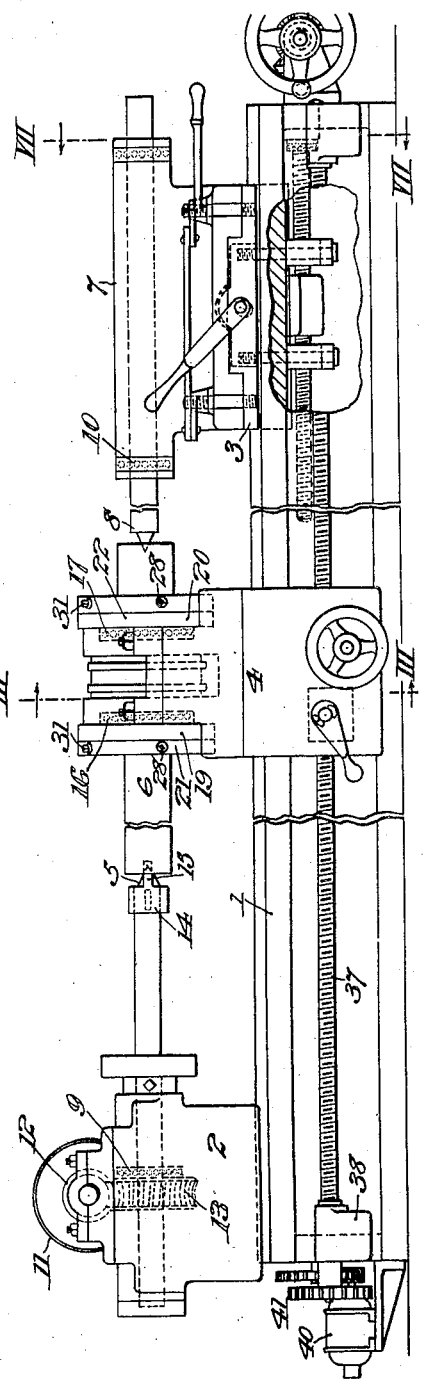
Fig. 2 represents a side elevation of the same.

The bed of the lathe is denoted by 1, on which bed are mounted the head stock 2, the tail stock 3 and the lathe carriage 4. The head stock 2 is provided with a rotatable live center 5 for driving engagement with one end of the work 6, which, in the present instance, is represented as a shaft. The tail stock 3 which is adjustable longitudinally along the bed is shown as provided with a laterally movable member 7 in which is rotatably mounted the dead center 8 for engaging the other end of the work 6. Ball thrust bearings 9 and 10 may be provided for the live and dead centers, if so desired.

The means which I have shown for rotating the work 6 slowly in one direction comprises an electric motor 11 mounted on the head stock 2, the shaft of which motor is provided with a worm 12 which meshes with a worm wheel 13, fast on the shaft of the live center 5.

The means for interlocking the live center 5 with the work 6, to ensure the rotation of the work with the live center, is herein shown as a collar 14 on the shaft of the live center, said collar having prongs 15 entering the end of the work within its periphery to permit the cutters to be run off the work at the live center as well as at the dead center.

The cutter holder which surrounds the work 6 is rotatably mounted in the lathe carriage 4 and, in the present instance, ball thrust bearings 16 and 17 are provided between the cutter holder and the carriage. This cutter holder, in the present instance, is shown as comprising a hollow hub section 18 and two end flanges 19 and 20, to the outer faces of which flanges are secured the two cutter supporting plates 21, 22 as, for instance, by bolts 23, 24. Each of these plates is provided with a circular series of cutters 25 and a circular series of work supports 26. There are three of the cutters and three of the work supports shown carried by each of the plates. The cutters are adjustable toward and away from the work along grooves 27 in the plates, by suitable adjusting screws 28 and may be secured in their adjusted positions by the clamp screws 29. The work supports 26 are adjustable toward and away from the work in grooves 30 in said plates, by suitable adjusting screws 31 and may be secured in their adjusted positions by the clamp screws 32.

By the above arrangement the circular series of cutters at each end of the cutter holder may be adjusted to cut a predetermined depth, and the corresponding circular series of work supports may be adjusted to properly support the work at the cutters.

The means which I have shown for revolving the cutters at high surface speed around the work is herein shown as comprising a high speed electric motor 33, mounted on the lathe carriage 4; the motor shaft pulley 34 having a double belt driving connection 35 with a pulley 36 keyed to the hub 18 of the cutter holder.

The means which I have shown for feeding the lathe carriage 4 back and forth along the work is herein shown as comprising a longitudinally disposed screw 37 rotatably mounted at its ends in suitable bearings 38, 39 and having a screw threaded engagement with the carriage, as is usual, said screw being driven in the present instance in either direction as required, by a reversible electric motor 40, mounted on the lathe frame and having a reduction gear driving connection 41, with the adjacent end of the screw 37 beyond the bearing 38.

By providing a belt drive connection between the electric motor 33 and the cutter holder, the cutters may be revolved at high speeds around the work without chatter or vibration, thereby permitting the cutters to be made of very high speed material such, for instance, as tungsten carbide, without danger of the said cutting material becoming disintegrated.

By causing the electric motor 11 to rotate the work slowly in the opposite direction from that in which the cutters are revolving, I am enabled to ensure a perfectly round turning of the work as well as increasing the relative surface speed of the cutters with respect to the work.

Furthermore, by providing a reversible electric motor drive for the lathe carriage reciprocating screw, I am enabled to accurately control the feeding speed of the carriage along the work in either direction for obtaining the best results.

The provision of the work supports alternating with the cutters around the work eliminates any tendency of the work to spring away from the cutters.

By providing two circular series of cutters in the cutter holder the time with which the work may be cut to the desired diameter is materially reduced.

It is evident that various changes may be resorted to in the construction, form and arrangement of the several parts without departing from the spirit and scope of my invention, and hence I do not intend to limit myself to the particular embodiment herein shown and described, but

What I claim is:—

1. In a turning lathe, cutters, their holder, an electric motor having a belt drive connection with the holder for revolving the cutters in one direction around the work, means for rotating the work in the opposite direction, and means for imparting a relative feeding movement of the holder and work.

2. In a turning lathe, cutters, their holder, an electric motor having a belt drive connection with the holder for revolving the cutters in one direction around the work, means for rotating the work in the opposite direction, and means for feeding the holder along the work.

3. In a turning lathe, a bed, a traveling carriage, cutters, their holder rotatably mounted on the carriage, means mounted on the carriage for rotating the holder to revolve the cutters in one direction around the work, means for rotating the work in the opposite direction, and means for feeding the carriage along the work.

4. In a turning lathe, a bed, a traveling carriage, cutters, their holder rotatably mounted on the carriage, an electric motor mounted on the carriage and having a belt drive connection with the tool holder for revolving the cutters in one direction around the work, means for rotating the work in the opposite direction, and means for moving the carriage along the work.

5. In a turning lathe, a bed, a traveling carriage, cutters, their holder rotatably mounted on the carriage, an electric motor mounted on the carriage for rotating the holder to revolve the cutters in one direction around the work, an electric motor for rotating the work in the opposite direction, and an electric motor for feeding the carriage along the work.

6. In a turning lathe, a bed, a traveling carriage, cutters, their holder rotatably mounted on the carriage, an electric motor mounted on the carriage and having a belt drive connection with the tool holder for revolving the cutters in one direction around the work, an electric motor for rotating the work in the opposite direction, and an electric motor for feeding the carriage along the work.

7. In a turning lathe, a bed, a traveling carriage, cutters, their holder rotatably mounted on the carriage, an electric motor mounted on the carriage for rotating the holder to revolve the cutters in one direction around the work, a head stock and its live center, a tail stock and its dead center, an electric motor operatively connected to the live center for rotating the work in the opposite direction, and an electric motor for feeding the tool holder along its work.

8. In a turning lathe, a bed, a traveling carriage, cutters, their holder rotatably mounted on the carriage, an electric motor mounted on the carriage and having a belt drive connection with the tool holder for revolving the cutters in one direction around the work, a head stock and its live center, a tail stock and its dead center, an electric motor operatively connected to the live center for rotating the work in the opposite direction, and an electric motor for feeding the tool holder along its work.

In testimony, that I claim the foregoing as my invention, I have signed my name this 18th day of April, 1930.

CALVERT B. COTTRELL, 3D.